United States Patent
Ichikawa

(10) Patent No.: US 6,888,531 B2
(45) Date of Patent: May 3, 2005

(54) COMMUNICATION DEVICE

(75) Inventor: Takehiro Ichikawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 09/989,450

(22) Filed: Nov. 21, 2001

(65) Prior Publication Data

US 2002/0060667 A1 May 23, 2002

(30) Foreign Application Priority Data

Nov. 22, 2000 (JP) ........................................ 2000-355913

(51) Int. Cl.$^7$ ................................................ G09G 5/00
(52) U.S. Cl. ........................ 345/156; 341/22; 715/704; 715/747; 715/762
(58) Field of Search .............................. 345/172, 716, 345/752, 738, 745, 748, 966, 968, 156, 162, 168; 455/438; 379/110.01; 700/11, 12, 15, 17, 18, 27; 708/142, 144, 145, 146; 715/704, 747, 762, 826

(56) References Cited

U.S. PATENT DOCUMENTS

| | | | |
|---|---|---|---|
| 6,476,825 B1 * | 11/2002 | Croy et al. | 345/716 |
| 6,509,908 B1 * | 1/2003 | Croy et al. | 345/716 |
| 6,535,590 B2 * | 3/2003 | Tidwell et al. | 379/110.01 |
| 6,618,039 B1 * | 9/2003 | Grant et al. | 345/168 |
| 6,625,649 B1 * | 9/2003 | D'Souza et al. | 709/225 |

FOREIGN PATENT DOCUMENTS

| | | |
|---|---|---|
| JP | 63-73445 | 4/1988 |
| JP | 11-298571 | 10/1999 |

OTHER PUBLICATIONS

Japanese Office Action dated Jun. 9, 2004, with English translation of pertinent portions.

* cited by examiner

*Primary Examiner*—Henry N. Tran
(74) *Attorney, Agent, or Firm*—Whitham, Curtis & Christofferson, PC

(57) ABSTRACT

A communication device comprises a key-input section 1 in which key operations are input by a user; a key-operation storing section 4a for storing key-input information input in the key-input section 1; an output section 3 for displaying the key-input information, which has been stored in the key-operation storing section 4a; a non-volatile memory section 4b for storing as an operational procedure key-input information selected by the user from the displayed key-input information; and a control section 2 for executing sequentially the selected key-input information, which has been stored as an operational procedure wherein the control section 2 may display on the output section 3, before execution by the user, an indication for confirming whether the selected key-input information is to be executed or not.

22 Claims, 6 Drawing Sheets

COMMUNICATION DEVICE

FIELD OF THE INVENTION

The present invention relates to a communication device wherein an operating procedure can be set and enrolled by a user.

BACKGROUND OF THE INVENTION

In conventional communication devices, a plurality of functions included in the communication device can be stored in an arbitrary combination. In such communication devices, some functions, which have been previously set and enrolled by a user are effected by such operations as depression of setting keys, and the subsequent depression of keys on ten-key pads as to which some functions have been previously enrolled.

Furthermore, an example of a so-called one-touch operations, wherein a plurality of functions has been stored previously in one of the keys, and the plurality of functions stored is executed by pushing down the keys, unlike the above-described case wherein a plurality of keys are pushed down to execute some functions, is described in Japanese Patent Laid-Open No. 9-18559.

In conventional communication devices, however, a user must first enter such operations in an enrolled mode, and select functions to be enrolled in the case where the user wishes to enroll a plurality of functions. Accordingly, the user goes to some trouble for entering into such enrolled mode, so that it is inconvenient for the user.

Furthermore, in conventional communication devices, a series of operational procedures cannot be enrolled, but merely functions themselves can be enrolled. In these circumstances, operational procedures of functions, which are used frequently by a user, cannot be enrolled. In this respect, a user must input each of the operational procedures separately, so that the user cannot obtain acceptable results as to operationality.

Moreover, since a conventional device has not been provided with a function for confirming a desired function to be applied by a user before execution thereof, there is a fear of conducting erroneously a function that is not intended by the user.

SUMMARY OF THE INVENTION

Accordingly, the present invention has been made in view of the problems involved in conventional communication devices as mentioned above. An object of the present invention is to provide a communication device by which user's operationality can be improved, and erroneous operation can be prevented from occurring.

In order to achieve the above-described object, a communication device according to the present invention comprises a key-input section in which key operations are input by a user; a key-operation storing section for storing key-input information input in the key-input section; a display section for displaying the key-input information, which has been stored in the key-operation storing section; a non-volatile memory section for storing key-input information as a series or combination of key-input information; and a control section for executing sequentially the key-input information, which has been stored in the non-volatile memory section as the series or combination of key-input information.

According to the above-described communication device of the present invention, key-input information, which has been input by a user through user's key operation, may be combined with each other, and the key-input information thus combined can be stored. Hence, an operational procedure for functions, which have been frequently used by the user, may be enrolled, whereby it can be easily executed, so that user's operationality is improved.

Furthermore, the above-described display section may be so constituted that it displays the key-input information in the same order that the key-input information was stored in the key-operation storing section.

Moreover, the above-described key-input information in the form of the series or combination may be stored in the above-described non-volatile memory section with a functional name that has been assigned to the key-input information.

Further, the above-described key-input information in the form of the series of operations may be allocated to a softkey disposed in the key-input section to be enrolled.

Still further, the above-described control section may be so constituted that it makes a display of an indication for confirming a) whether or not display of the key-input information has been made on the display section before executing sequentially the key-input information in the form of the series or combination of functions, and b) whether or not execution of the key-input information has been started in the case where there was such an input by a user through the key-input section to the effect that the execution of the key-input information should be started.

As a result, the user can decide whether it should be executed or not after confirming contents of such execution by himself (or herself). Therefore, erroneous execution of a function not intended by the user can be prevented.

Yet further, a capability for transmitting and receiving e-mail may be included in the above-described communication device, and the key-input information in the form of the series or combination of functions relates to an operational procedure for transmission and/or reception of e-mail.

In addition, a capability for linking to the Internet may be included in the above-described communication device, and the key-input information in the form of the series or combination of functions relates to an operational procedure for accessing a specific site on the Internet.

As described above, an operational procedure for transmission and/or reception of e-mail, or an operational procedure for accessing a specific site on the Internet, may be enrolled, preventing erroneous input of an e-mail address by a user. Accordingly, it becomes possible to prevent erroneous transmission of an e-mail to a different address, or erroneous accessing to Internet, which has not been intended by a user.

BRIEF DESCRIPTION OF THE DRAWINGS

The present invention will be explained in more detail in conjunction with appended drawings, wherein.

DESCRIPTION OF THE PREFERRED EMBODIMENT

Figure 1:
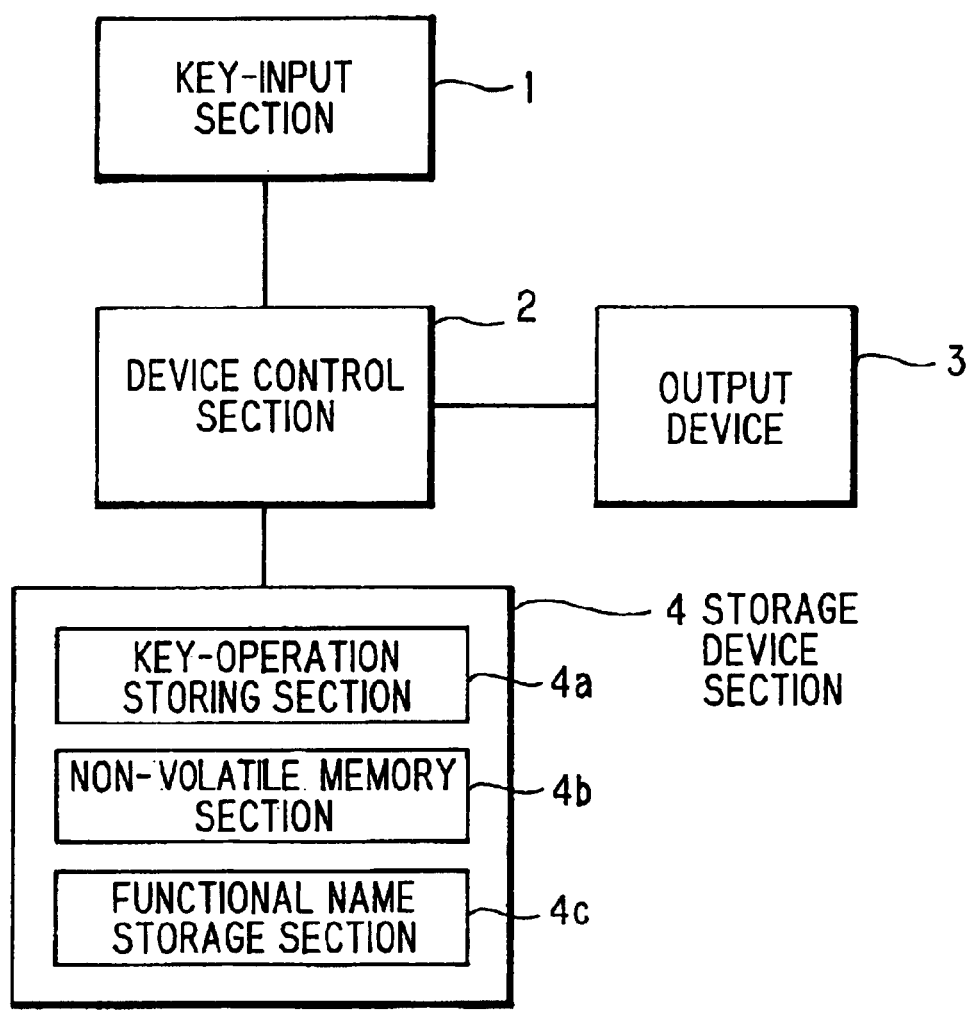
FIG. 1 is a block diagram illustrating an outlined constitution of an embodiment of a communication device according to the present invention.

In the following, an embodiment of the present invention will be described in detail by referring to the accompanying drawings wherein FIG. 1 is a block diagram illustrating an embodiment of a communication device according to the present invention.

Referring to FIG. 1, a communication device of the present embodiment comprises a key-input section 1 for setting key operations by a user; a device control section 2 for analyzing contents, which have been input through keys to store setting results relating thereto or to control an output device based thereon; an output device 3 for displaying data, which have been entered, and emitting sounds for certain purposes; a key-operation storing section 4a for storing key-operations, which were entered by a user; a non-volatile memory section 4b for storing data, which have been deposited in the key-operation storing section 4a, into a non-volatile area; and a storage device section 4 including a functional name storage section 4c for enrolling functional names for key-input information.

The key-input section 1 includes a soft key to which a plurality of functions may be allocated other than keys on the so-called ten-kay pad and function keys. Key data presented by a user pushing down a key on a keypad is transmitted to the device control section 2. The device control section 2 analyzes the key data from the key-input section 1 to execute storage and erasure of key-input information. The device control section 2 transmits also display data to be displayed on an LCD (liquid crystal display unit) of the output device 3 in conformity with an operation executed.

The output device 3 is composed of an LCD, a speaker, a receiver and the like, and the output device 3 displays data assigned by the device control section 2 by means of images and sounds.

The key-operation storing section 4a of the storage device section 4 is allowed to analyze key-data, i.e., key-input information input from the key-input section 1 by means of the device control section 2, and stores the data analyzed. Furthermore, the key-operation storing section is used also when key-input information is stored in the non-volatile memory section 4b. The non-volatile memory section 4b stores data transmitted from the key-operation storing section 4a, and the functional name storage section 4c is used when storage names of key-input information are fixed to softkeys.

The functional name storage section 4c stores a functional name of a softkey executing key-input information fixed thereto.

Operations of the above-described communication device will be described in more detail hereinafter.

Referring again to FIG. 1, key-data input in the key-input section 1 is analyzed in the device control section 2, and the results analyzed are displayed on an LCD of the output device 3. When the results of analysis of the key-data in the device control section 2 require an enrollment of key-input information, histories of key-input information stored in the key-operation storing section 4a are displayed on the LCD of the output device 3 in sequence. When certain key-input information is required to be stored, it is fixed by a user's key operation. Storage of other key-input information is not required; such key-input information is erased by a predetermined key-operation.

As a result of analysis of key-data, when the key-input information is required to be fixed, such key-input information is stored in the non-volatile memory section. Then, the following key-input information, which has been stored in the key-operation storing section 4a, is displayed on the LCD of the output device 3, and such key-input information is stored in the non-volatile memory section 4b in the same manner as that described above. In this situation, key-input information stored in the non-volatile memory section 4b is in the form of a series of combined key-inputs. When all the key-input information has been stored in the non-volatile memory section 4b, completion of enrollment is displayed on the LCD of the output device 3, to the effect that a functional name of a softkey may be input.

As a result of analysis of key-data in the device control section 2, when the obtained result requests deletion of key-input information, the corresponding key-input information is deleted, and the following key-input information, which has been stored in the key-operation storing section 4a, is displayed on the LCD of the output device 3. Such operations are repeated, and when no key-input information exists in the key-operation storing section 4a, a message to the effect that a functional name of a softkey may be input is displayed on the LCD of the output device 3. In the case where no key-input information exists in the non-volatile memory section 4b, a message to the effect that a decision should be made whether key-input information, which has been stored in the key-operation storing section 4a, is to be erased or not is output on the LCD of the output device 3.

When an analysis of the key-data shows that it is in process of inputting a functional name of a softkey, this situation is maintained in the functional name storage section 4c. On one hand, as a result of analysis of input data in the device control section 2, when the result indicates fixation of a functional name of the softkey, the data stored in the functional name storage section 4c is linked with the key-input information stored in the non-volatile memory section 4b, and the resulting data is stored in the functional name storage section 4c. In the case when it is requested to fix a functional name of a softkey in a situation where no functional name of the softkey has been input, default data is stored in the functional name storage section 4c and linked with key-input information stored in the non-volatile memory section 4b. After the data is stored, a message to the effect that key-input information was linked to a functional name is displayed on the LCD of the output device 3.

On the other hand, when an analysis of key-data shows a request to delete key-input information, all the key-input information residing in the key-operation storing section 4a, the non-volatile memory section 4b, and the functional name storage section 4c is erased. After completing erasure, a fact of erasure is displayed on the LCD of the output device 3.

When analysis of key-data shows that a softkey has been pushed, functional names of enrolled key-input information are displayed on the LCD of the output device 3, together with an indication of a decision whether a certain functional name of key-input information should be executed or not.

As a result of analyzing key-data, when the result directs execution of key-input information, the device control section 2 executes sequentially the key-input information stored in the non-volatile memory section 4b. In the case when no key-input information is executed, it is judged whether or not there is key-input information, which has been stored other than the information described above. If the other information has been stored, a functional name of the key-input information, which has been enrolled, is displayed on the LCD of the output device 3, and such a message that it is requested to decide whether or not such key-input information should be executed is further displayed on the LCD of the output device 3. In the case where no key-input information has been stored other that described above, no operation is taken and its shifts to a normal condition.

As a result of analyzing key-data, when it is requested to compile key-input information, the key-input information stored in the non-volatile memory section 4b is developed in the key-operation storing section 4a, and a message that key-input information is being compiled is displayed on the LCD of the output device 3.

As mentioned above, in a communication device of the present embodiment, key-input information, which has been input by means of user's key-operation, can be stored in the key-operation storing section 4a as a series or combination. Accordingly, when a user enrolls an operational procedure for certain functions frequently employed by the user, such a series of functions in an operational procedure can be conducted by the user's one-touch operation. Thus, operationality of a communication device in the present invention is more improved than that wherein a procedure comprising several operations is input one by one, and then, the operational procedure is executed.

Moreover, a device control section 2 of the communication device of the invention displays on the LCD of output device 3 an indication for confirming whether or not an operational procedure should be executed before such series of functions in an operational procedure selected by a user is practically executed. Hence, the user can decide whether the operational procedure should be executed or not after confirming contents of execution by the user himself (or herself), so that it is possible to prevent execution of functions not intended by the user.

Furthermore, when the above-described series of functions in an operational procedure is the one for transmission and/or reception of e-mail or the one for accessing to a specific site on Internet, an erroneous input for an address can be prevented, so that it is possible to prevent from erroneous transmission of e-mail or erroneous accessing an Internet site, which is not an intended site.

It is to be noted that the present invention is applicable also for a communication device wherein its key operations are complicated and a large amount of data must be handled, in addition to a mobile communication device such as cellular phone, and PHS (registered trademark).

In the following, setting operation for operational procedure in a communication device of the present embodiment will be described in detail by referring to FIG. 1 as well as to FIGS. 2 through 6. FIGS. 2 through 6 are flowcharts each explaining a series of operations of the communication device shown in FIG. 1.

Figure 2:
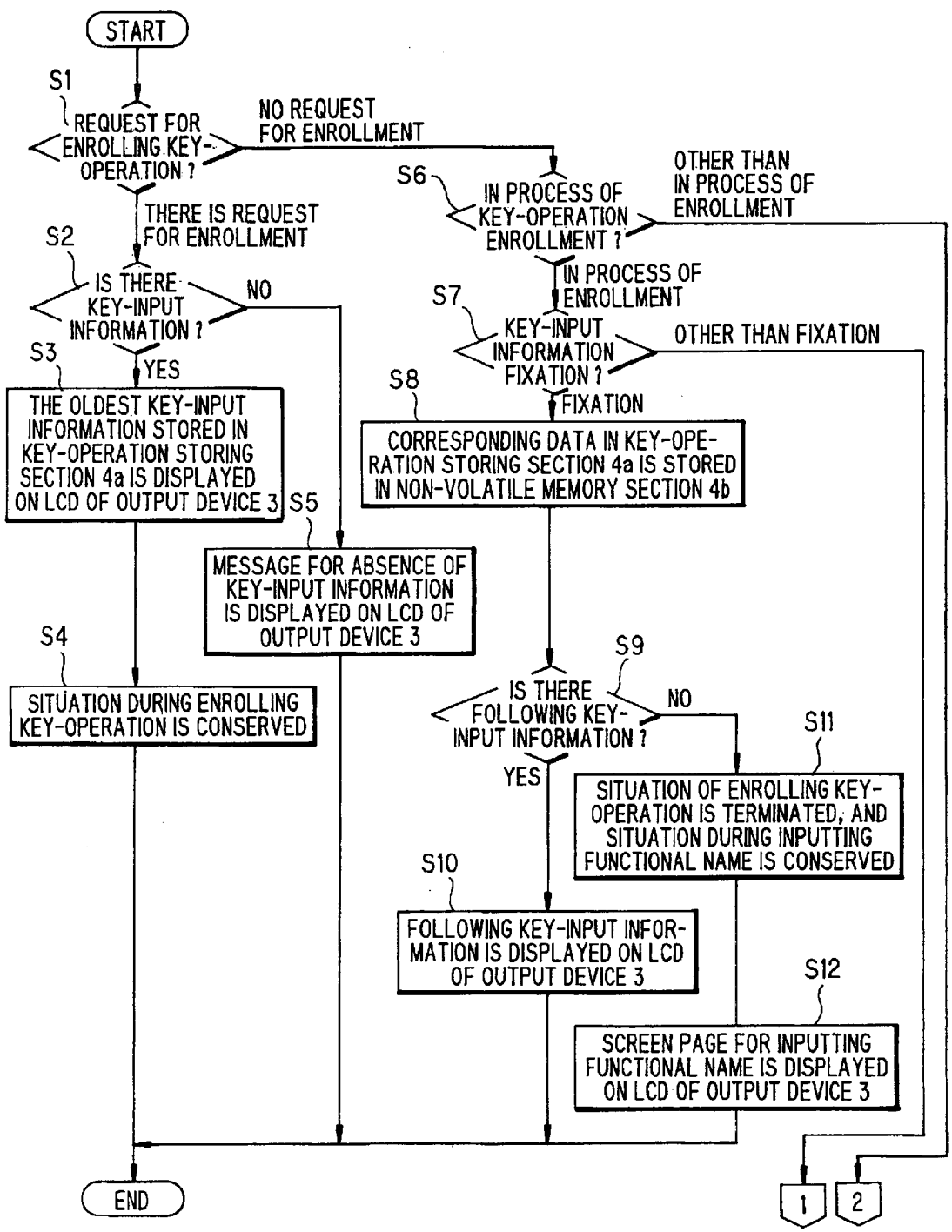
FIG. 2 is a flowchart for explaining a series of operations in the communication device shown in FIG. 1.

In the communication device of the present embodiment, first, a user makes key operations in a key-input section 1, whereby the setting of an operational procedure is begun. When device control section 2 is informed from the key-input section 1 that key-data has been input by the user, the device control section 2 which receives the information decides whether the key-data is a request for enrollment of key-input information as shown in FIG. 2 (S1).

As a result of the decision, when the request was the one for enrollment of key-input information, it is decided whether or not there is key-input information in a key-operation storing section 4a (S2). If there is key-input information in the key-operation storing section 4a, the oldest key-input information is displayed on the LCD of an output device 3 (S3). Thereafter, a situation during enrollment of key-input information is conserved (S4). On the other hand, if there is no key-input information, a fact to the effect that no key-input information exists is displayed on the LCD of the output device 3 (S5).

Furthermore, as a result of the above-described decision (S2), when it was not a request for enrollment of key-input information, it is judged whether or not an operation is in process of enrollment of key-input information (S6). If it is in process of enrollment of key-input information, it is decided whether the key-input information is fixed or not (S7). In the case when the key-input information is fixed, the corresponding data in the key-operation storing section 4a is stored in a non-volatile memory section (S8). Thereafter, it is decided whether or not there is the following key-input information (S9). When there is the following key-input information, it is displayed on the LCD of the output device 3 (S10). If there is no following key-input information, a situation where there is in process of enrolling key-input information is altered to a situation where there is in process of inputting a functional name (S11). A screen page for inputting a functional name of a softkey is displayed on the LCD of the output device 3 (S12).

Figure 3:
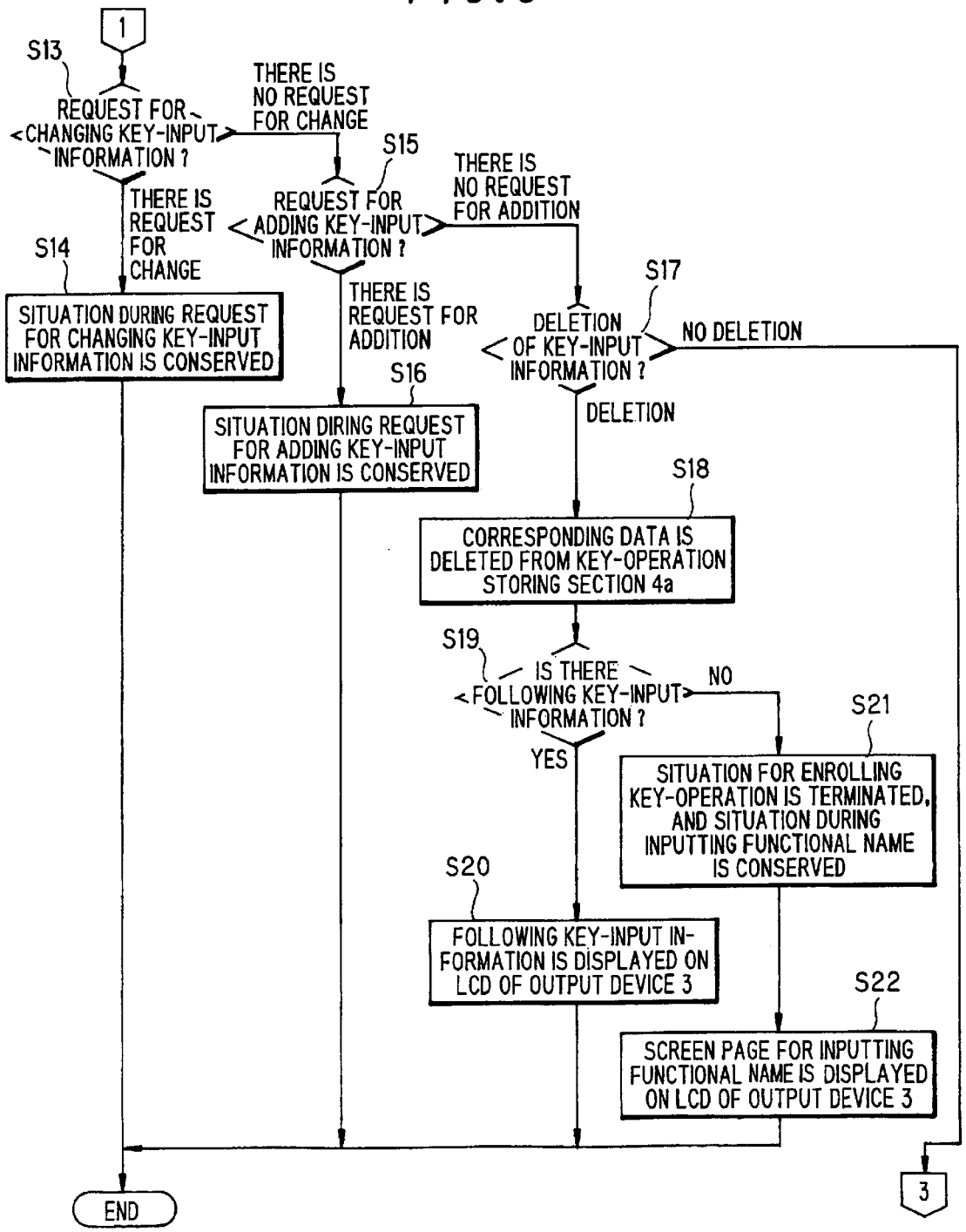
FIG. 3 is a flowchart for explaining another series of operations in the communication device shown in FIG. 1.

On the other hand, when key-input information is not fixed as a result of the above-described decision (S7), it is judged whether or not it is a request for changing key-input information as shown in FIG. 3 (S13). When it was a request for changing key-input information, a condition wherein it is in process of the request for changing key-input information is conserved (S14). When it is not a request for changing key-input information, it is judged whether the request is the one for adding key-input information or not (S15).

As a result of the decision (S15), when it was a request for adding key-input information, a condition where it is in process of requesting addition of key-input information is maintained (S16). On the other hand, when a request was not the one for adding key-input information, it is judged whether or not key-input information is deleted (S17). In the case where the key-input information is deleted, the corresponding key-input information is deleted from the key-operation storing section 4a (S18). It is judged whether or not there is the following key-input information (S19). In the case where there is the following key-input information, it is displayed on the LCD of the output device 3 (S20). If there is no following key-input information, a condition for enrolling key-input information is terminated to conserve a situation where it is in process of inputting a functional name (S21), and a screen page for inputting a functional name is displayed on the LCD of the output device 3 (S22).

Figure 4:
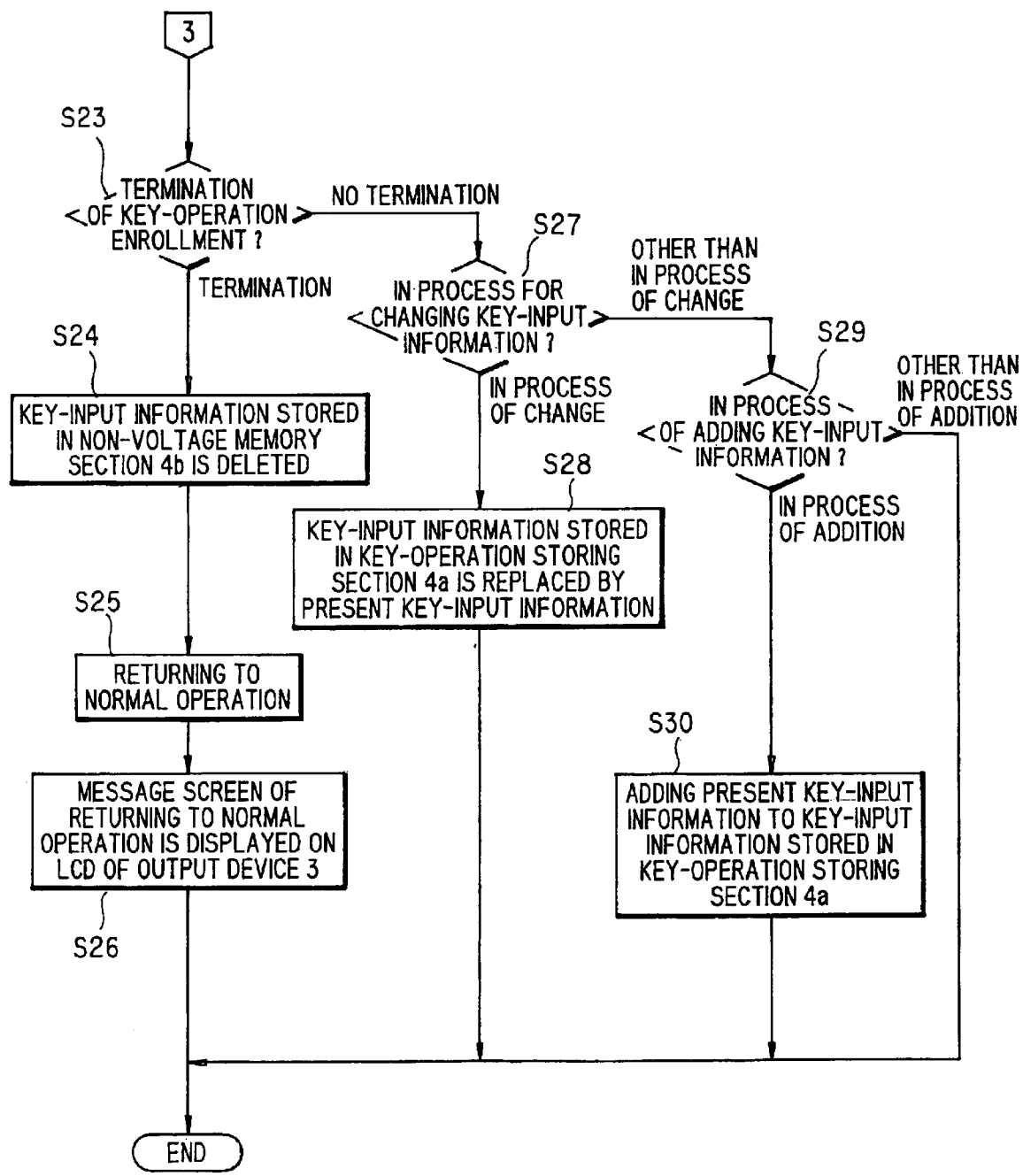
FIG. 4 is a flowchart for explaining a further series of operations in the communication device shown in FIG. 1.

As a result of the judgment (S17), when a conclusion is a case other than that key-input information should be deleted, it is judged whether or not enrollment of key-input information is terminated (S23) as shown in FIG. 4. As a result of the judgments, when the enrollment of key-input information should be terminated, the key-input information, which has been stored in the non-volatile memory section 4c, is erased (S24), and the communication device is returned to a normal operation (S25). Thereafter, such a screen page wherein a fact to the effect that the communication device is returned to a normal operation is notified is displayed on the LCD of the output device 3 (S26).

On one hand, when enrollment of key-input information should not be terminated, it is judged whether or not a situation is in process of changing key-input information (S27). If it is in process of changing key-input information, the key-input information, which has been stored in the key-operation storing section 4a is replaced by that based on key-data, which was newly input (S28).

On the other hand, if it is a case where a situation in not in process of changing key-input information, it is judged whether or not the situation is in process of adding key-input information (S29). If the situation is in process of adding key-input information, key-input information that was newly input is added to the key-input information, which has been stored in the key-operation storing section 4a (S30). If the situation is a case where it is not in process of adding key-input information, no operation is further taken to complete its procedure.

Figure 5:
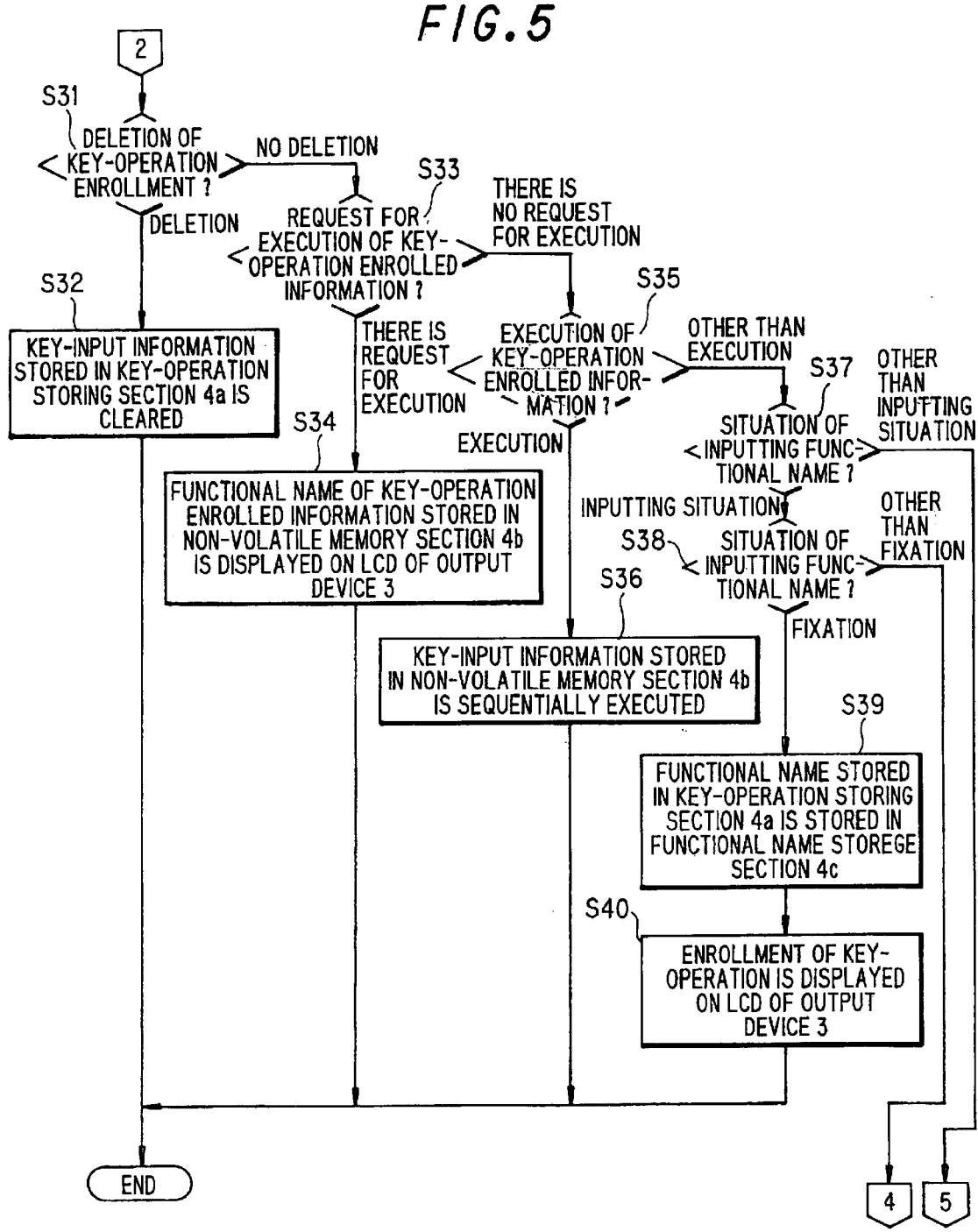
FIG. 5 is a flowchart for explaining a still further series of operations in the communication device shown in FIG. 1.

As a result of the judgment (S6) shown in FIG. 2, if it is the case where the situation is not in process of enrolling key-input information, it is judged whether or not enrollment of key-input information is deleted as shown in FIG. 5 (S31). If it is a case where enrollment of key-input information should be deleted, the key-input information, which has been stored in the key-operation storing section 4a, is erased (S32). On the other hand, when it is a case where enrollment or key-input information should not be deleted, it is judged whether or not a request is the one for executing key-input information (S33).

If it is a case where a situation requests execution of key-input information, a functional name of the key-input information, which has been stored in the non-volatile memory section 4b, is displayed on the LCD of the output device 3 (S34). On the other hand, if it is a case where a situation does not request execution of key-input information, it is decided whether such key-input information is executed or not (S35). In the case where it should be executed, such key-input information, which has been stored in the non-volatile memory section 4b, is sequentially executed (S36). In case of no execution of key-input information, it is judged whether or not a situation is in a case where a functional name is input (S37).

If it is in the case where a functional name is input, it is decided whether a functional name is fixed or not (S38). In case of fixing the functional name, a functional name, which has been stored in the key-operation storing section 4a is stored in the functional name storage section 4c (S39), and the functional name enrolled is displayed on the LCD of the output device 3 (S40). In case of making no fixation of a functional name, the functional name, which has been stored in the key-operation storing section 4a is updated (S41) as shown in FIG. 6(a).

Figures 6A, 6B:
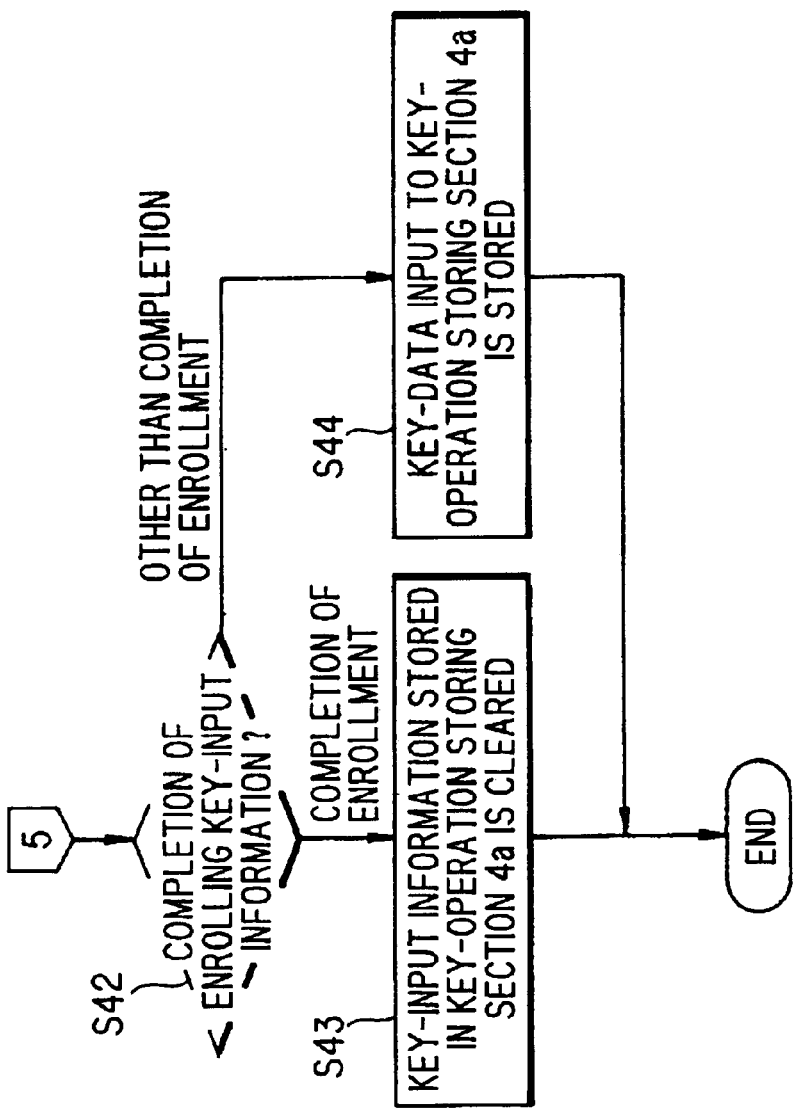
FIG. 6 is a flowchart for explaining a yet further series of operations in the communication device shown in FIG. 1.

As a result of the judgment (S37), if a situation is in a case where a functional name is not input, it is decided whether or not enrollment of key-input information is to be completed as shown in FIG. 6(b) (S42). In case of completing the enrollment of key-input information, the key-input information, which has been stored in the key-operation storing section 4a, is erased (S43). In the case where enrollment of key-input information is not completed, key-data, which was input, is stored in the key-operation storing section 4a, and key-input information is updated (S44).

As described above, a communication device according to the present invention comprises a key-input section in which key operations are implemented by a user; a key-operation storing section for storing key-input information input in the key-input section; a display section for displaying the key-input information, which has been stored in the key-operation storing section; a non-volatile memory section for storing key-input information selected by the user with the use of the key-input section from the key-input information displayed on the display section as a series of combination of key-input information: and a control section for executing sequentially the key-input information, which has been stored in the non-volatile memory section as the series of combination of key-input information. Accordingly, a user can enroll an operational procedure of functions, which are frequently employed by the user, so that operationality of the communication device can be elevated.

Moreover, the control section involves such constitution that an indication for confirming whether execution of key-input information should be started or not is displayed on the display section before executing sequentially key-input information as a series of combination of key-input information; and such execution of key-input information is started in the case when the user was made an input for starting the execution of key-input information through the key-input section, whereby it may be prevented from occurring erroneous execution of functions, which is not intended by the user.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A communication device, comprising:
   a key-input section in which key operations are input by a user;
   a key-operation storing section for storing key-input information input in said key-input section;
   a display section for displaying said key-input information as a combination, which has been stored in said key-operation storing section;
   a non-volatile memory section for storing as an operational procedure a series of said displayed key-input information combinations, each said displayed key-input combination having been selected by the user for fixation, said series ending when there is no following key-input information; and
   a control section for executing said operational procedure by displaying for review and editing and then sequentially executing each of said selected key-input information combinations in said series, which has been stored in said non-volatile memory section as a sequence of combinations of keys.

2. A communication device as claimed in claim 1, wherein:
   said display section displays said key-input information in accordance with an order that said key-input information was stored in said key-operation storing section.

3. A communication device as claimed in claim 2, wherein:
   at least one of said key-input information combinations is stored in said non-volatile memory section as a functional name which has been assigned to said key-input information combination.

4. A communication device as claimed in claim 3, wherein:
   said control section makes a display of an indication for confirming whether execution of said key-input information is to be started or not on said display section before executing sequentially said key-input information in the form of said series of selected key-input combinations, and said execution of the key-input information is started in the case where there was such an input by a user through said key-input section to the effect that said execution of the key-input information should be started.

5. A communication device as claimed in claim 3, wherein:
   a capability for transmitting and receiving e-mail is involved, and said key-input information in the form of said series of selected key-input combinations relates to an operational procedure for transmission and/or reception of e-mail.

6. A communication device as claimed in claim 3, wherein:
   a capability for linking to Internet is involved, and said key-input information in the form of said series of selected key-input combinations relates to an operational procedure for accessing to a specific site on Internet.

7. A communication device as claimed in claim 2, wherein:
   said key-input information in the form of said series of selected key-input combinations is allocated to a soft-key disposed in said key-input section to be enrolled.

8. A communication device as claimed in claim 2, wherein:
   said control section makes a display of an indication for confirming whether execution of said key-input information is to be started or not on said display section before executing sequentially said key-input information in the form of said series of selected key-input combinations, and said execution of the key-input information is started in the case where there was such an input by a user through said key-input section to the effect that said execution of the key-input information should be started.

9. A communication device as claimed in claim 2, wherein:

a capability for transmitting and receiving e-mail is involved, and said key-input information in the form of said series of selected key-input combinations relates to an operational procedure for transmission and/or reception of e-mail.

10. A communication device as claimed in claim 2, wherein:

a capability for linking to Internet is involved, and said key-input information in the form of said series of selected key-input combinations relates to an operational procedure for accessing to a specific sites on Internet.

11. A communication device as claimed in claim 1, wherein:

at least one of said key-input information combinations is stored in said non-volatile memory section as a functional name which has been assigned to said key-input information combination.

12. A communication device as claimed in claim 11, wherein:

said key-input information in the form of said series of selected key-input combinations is allocated to a soft-key disposed in said key-input section to be enrolled.

13. A communication device as claimed in claim 11, wherein:

said control section makes a display of an indication for confirming whether execution of said key-input information is to be started or not on said display section before executing sequentially said key-input information in the form of said series of selected key-input combinations, and said execution of the key-input information is started in the case where there was such an input by a user through said key-input section to the effect that said execution of the key-input information should be started.

14. A communication device as claimed in claim 11, wherein:

a capability for transmitting and receiving e-mail is involved, and said key-input information in the form of said series of selected key-input combinations relates to an operational procedure for transmission and/or reception of e-mail.

15. A communication device as claimed in claim 11, wherein:

a capability for linking to Internet is involved, and said key-input information in the form of said series of selected key-input combinations relates to an operational procedure for accessing to a specific site on Internet.

16. A communication device as claimed in claim 1, wherein:

said key-input information in the form of said series of selected key-input combinations is allocated to a soft-key disposed in said key-input section to be enrolled.

17. A communication device as claimed in claim 16, wherein:

said control section makes a display of an indication for confirming whether execution of said key-input information is to be started or not on said display section before executing sequentially said key-input information in the form of said series of selected key-input combinations, and said execution of the key-input information is started in the case where there was such an input by a user through said key-input section to the effect that said execution of the key-input information should be started.

18. A communication device as claimed in claim 1, wherein:

said control section makes a display of an indication for confirming whether execution of said key-input information is to be started or not on said display section before executing sequentially said key-input information in the form of said series of selected key-input combinations, and said execution of the key-input information is started in the case where there was such an input by a user through said key-input section to the effect that said execution of the key-input information should be started.

19. A communication device as claimed in claim 18, wherein:

a capability for transmitting and receiving e-mail is involved, and said key-input information in the form of said series of selected key-input combinations relates to an operational procedure for transmission and/or reception of e-mail.

20. A communication device as claimed in claim 18, wherein:

a capability for linking to Internet is involved, and said key-input information in the form of said series of selected key-input combinations relates to an operational procedure for accessing to a specific site on Internet.

21. A communication device as claimed in claim 1, wherein:

a capability for transmitting and receiving e-mail is involved, and said key-input information in the form of said series of selected key-input combinations relates to an operational procedure for transmission and/or reception of e-mail.

22. A communication device as claimed in claim 1, wherein:

a capability for linking to Internet is involved, and said key-input information in the form of said series of selected key-input combinations relates to an operational procedure for accessing to a specific site on Internet.

* * * * *